(12) United States Patent
Balourdet

(10) Patent No.: US 10,348,354 B1
(45) Date of Patent: Jul. 9, 2019

(54) EXPLOSION PROOF ASSEMBLY

(71) Applicant: Xciel, Inc., Katy, TX (US)

(72) Inventor: Xavier Balourdet, Houston, TX (US)

(73) Assignee: Xciel, Inc., Katy, TX (US)

( * ) Notice: Subject to any disclaimer, the term of this patent is extended or adjusted under 35 U.S.C. 154(b) by 0 days.

(21) Appl. No.: 16/001,989

(22) Filed: Jun. 7, 2018

(51) Int. Cl.
*H04B 1/3888* (2015.01)
*H04M 1/02* (2006.01)
*G06F 1/16* (2006.01)

(52) U.S. Cl.
CPC ......... *H04B 1/3888* (2013.01); *G06F 1/1626* (2013.01); *G06F 1/1656* (2013.01); *H04M 1/0202* (2013.01); *G06F 1/1643* (2013.01); *G06F 2200/1633* (2013.01)

(58) Field of Classification Search
CPC ... H04B 1/3888; G06F 1/1626; G06F 1/1656; G06F 1/1643; G06F 2200/1633; H04M 1/0202
USPC ...................................... 455/575.8
See application file for complete search history.

(56) References Cited

U.S. PATENT DOCUMENTS

| | | | |
|---|---|---|---|
| 4,664,281 A | 5/1987 | Falk et al. | |
| 4,847,602 A | 7/1989 | Altland et al. | |
| 4,894,748 A | 1/1990 | Shefet | |
| 5,534,664 A | 7/1996 | Fearing, Jr. et al. | |
| 5,583,742 A | 12/1996 | Noda et al. | |
| 5,838,589 A | 11/1998 | Nail et al. | |
| 6,392,322 B1 * | 5/2002 | Mares | B23Q 5/58 310/12.04 |
| 6,574,652 B2 | 6/2003 | Burkhard | |
| 6,583,982 B2 | 6/2003 | Mancini et al. | |
| 6,795,319 B2 | 9/2004 | Preston et al. | |
| 7,102,081 B2 | 9/2006 | Xu et al. | |
| 7,321,096 B1 | 1/2008 | Huang | |
| 7,436,653 B2 | 10/2008 | Yang et al. | |
| 7,907,394 B2 | 3/2011 | Richardson et al. | |
| 7,916,117 B2 | 3/2011 | Staiger | |
| 7,921,997 B2 | 4/2011 | Burns | |
| 8,328,008 B2 | 12/2012 | Diebel et al. | |
| 8,503,170 B1 | 8/2013 | Hsu et al. | |
| 8,875,879 B2 | 11/2014 | Diebel et al. | |
| 9,261,912 B2 | 2/2016 | Bell | |
| 9,615,476 B2 | 4/2017 | Rayner et al. | |
| 10,097,677 B1 * | 10/2018 | Balourdet | H04M 1/18 |
| 2003/0184958 A1 | 10/2003 | Kao | |
| 2004/0002269 A1 | 1/2004 | Jahn | |
| 2005/0011920 A1 | 1/2005 | Feng | |
| 2006/0149430 A1 | 7/2006 | Slaton | |

(Continued)

*Primary Examiner* — Mong-Thuy T Tran
(74) *Attorney, Agent, or Firm* — Rao DeBoer Osterrieder, PLLC; John M. DeBoer

(57) ABSTRACT

An explosion proof assembly that includes a first portion with a window; an outer touchscreen adhesively sealed around a perimeter of a first portion rear face; and a second portion releasably coupled to the first portion. The second portion has a second portion inner surface defined by a second portion inner edge that transitions into a second portion dissipation wall. The second portion has a second portion window sealed off by a rear element sealingly engaged around a perimeter of a second portion shoulder surface. The assembly includes a mobile device operable via a mobile device touchscreen. Upon assembly, the outer touchscreen is transmissive to the mobile device touchscreen, and the rear element is inductive to an electromagnetic signal.

17 Claims, 7 Drawing Sheets

(56) References Cited

U.S. PATENT DOCUMENTS

| | | |
|---|---|---|
| 2007/0095554 A1 | 5/2007 | Noda |
| 2007/0221288 A1 | 9/2007 | Olesen et al. |
| 2007/0280677 A1 | 12/2007 | Drake et al. |
| 2007/0282208 A1 | 12/2007 | Jacobs et al. |
| 2009/0059492 A1 | 3/2009 | Glover |
| 2009/0272662 A1 | 11/2009 | Lin et al. |
| 2010/0258331 A1 | 10/2010 | Dahlgren et al. |
| 2011/0051348 A1 | 3/2011 | Song |
| 2011/0090846 A1 | 4/2011 | Hao et al. |
| 2012/0033396 A1 | 2/2012 | Goedknegt et al. |
| 2012/0057295 A1 | 3/2012 | Simpson et al. |
| 2012/0314354 A1 | 12/2012 | Rayner |
| 2013/0120258 A1 | 5/2013 | Maus |
| 2013/0193149 A1 | 8/2013 | Balourdet |
| 2013/0271902 A1* | 10/2013 | Lai .......................... H04R 1/02 361/679.01 |
| 2014/0226062 A1 | 8/2014 | Parrill |
| 2015/0194995 A1 | 7/2015 | Fathollahi et al. |
| 2015/0227178 A1* | 8/2015 | Rayner ................... G06F 1/163 361/679.4 |
| 2015/0265018 A1 | 9/2015 | Balourdet |
| 2018/0046229 A1 | 2/2018 | Balourdet |

\* cited by examiner

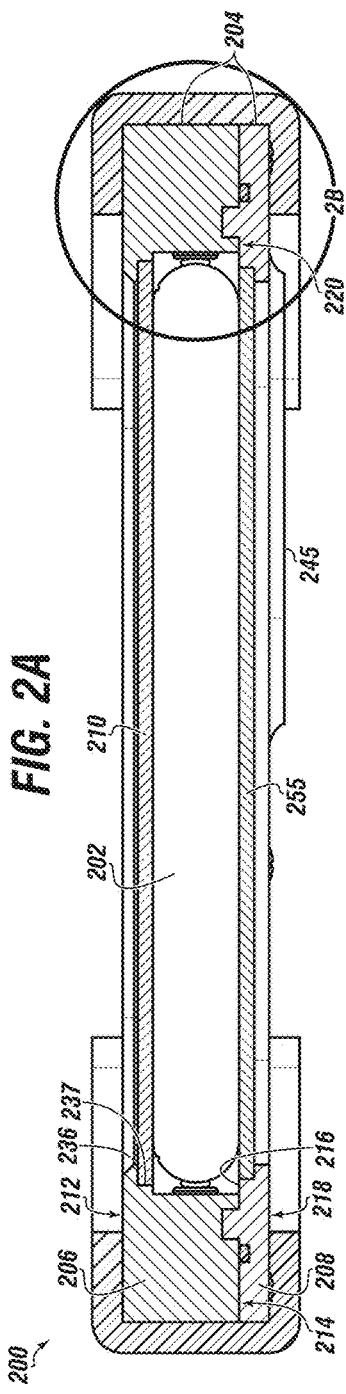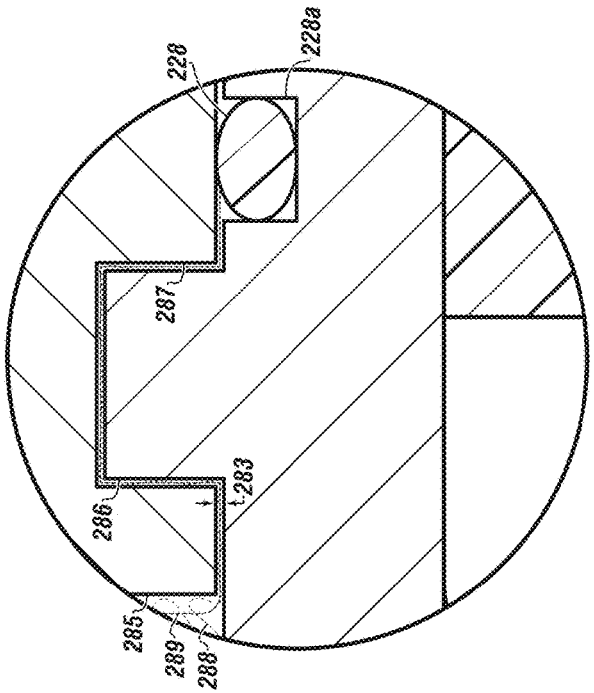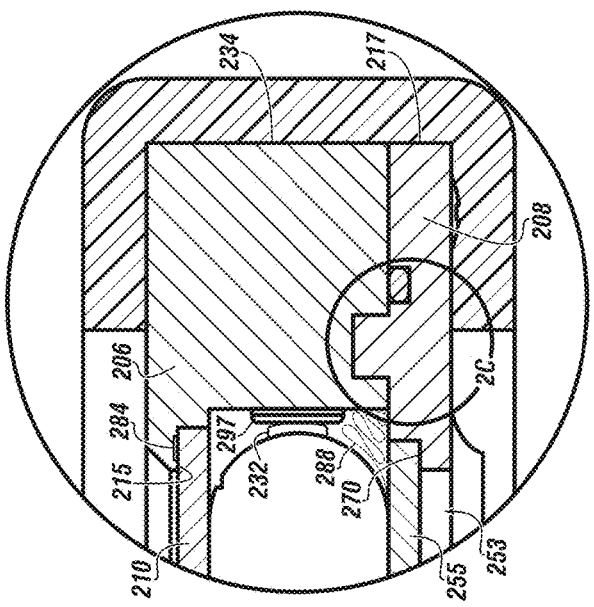

EXPLOSION PROOF ASSEMBLY

STATEMENT REGARDING FEDERALLY SPONSORED RESEARCH OR DEVELOPMENT

Not Applicable.

BACKGROUND

Background of the Disclosure

The use of electrical devices in hazardous areas may lead to an increased risk of a fire or explosion triggered by the presence of the electrical device. For instance, an electrical device may serve as an ignition source in a hazardous area containing flammable gasses, vapors or dust. For this reason, electrical devices used in hazardous areas are often required to be certified according to the requirements specified in that particular jurisdiction. Further, often the types of protections required vary depending on the risks and hazards involved.

Hazardous environments have been categorized and regulated, but the specific classification, regulating, and governing thereof depends on jurisdiction. Electrical codes and standards for hazardous areas are generally understood as having two distinct paths. In North America, a 'Class, Division' system has been utilized, whereas other parts of the world use a 'Zone System' based predominantly on standards from the International Eletrochemical Commission (IEC) and European Community for Electrotechnical Standardization (CENELEC). A main difference is in the Zone system is that the level of hazard probability is divided into three 'zones' as opposed to two 'divisions'

The types of hazardous environments are broken down into three classes, with each class focusing on different types of hazardous materials in the surrounding atmosphere. For instance: Class I areas include flammable gasses or vapors present in the air in sufficient quantities to produce an explosion in the presence of an ignition source; Class II areas include the presence of combustible dusts; and Class III areas include ignitable fibers or other materials too heavy to be suspended in the air in sufficient quantities to produce an ignitable mixture (e.g., wood chips, cotton, nylon, etc.).

Two common types of hazardous areas requiring protection for electrical devices are areas that contain flammable vapors and areas containing dust or other particulates susceptible to ignition. Further, each class is divided into two divisions based on the probability of hazardous materials being present in an ignitable or combustible concentration in the surrounding air. Division 1 defines hazardous environments where the pertinent hazardous material (e.g., vapors, dust, fibers) is present during normal conditions. Division 2 defines hazardous environments where the pertinent hazardous material is present only in abnormal or fault conditions (e.g., in the event of a container failure or other leak).

Regarding Class I hazardous environments involving flammable vapors, an electrical device may be used in such an area via an explosion proof enclosure or assembly configured to keep an internal explosion within the explosion proof enclosure from escaping outward, where it would ignite vapors outside of the enclosure. Thus, with regard to environments having flammable vapors, explosion proof assemblies are designed to both reduce the entry of flammable materials into the enclosure and also, in the event of an explosion within the enclosure, to prevent the escape of hot or burning material from escaping the enclosure.

Regarding Class II hazardous environments involving ignitable dusts and particulates, an electrical device may be used in such an area via a dust-ignition proof enclosure or assembly that is configured to prevent ignitable materials from entering the enclosure and by containing any arcs, sparks or heat within the enclosure that may ignite dust or other particulates in the surrounding environment. Also, there exists assemblies and enclosures for use with an electrical device that are referred to as "intrinsically safe," where an intrinsically safe assembly including an electrical device is incapable of releasing sufficient electrical or thermal energy to cause ignition of a specific hazardous substance (i.e., Class I, Class II and Class III substances) under normal or abnormal conditions. Further, "non-incendive" components are non-sparking and can be used in Div1, Zone1 areas when coupled with explosion proof enclosure.

While assemblies or enclosures have been developed for use in hazardous areas, these components are often expensive and not configured for use with particular electrical devices. Also, these components may only satisfy the requirements for a particular class and division, and thus may not be used in other hazardous environments or in hazardous environments under abnormal conditions (i.e., Division 2 conditions). Further, these components may be permanently coupled to the protected electrical device, restricting the use of multiple electrical devices with the same enclosure. Thus, there is a need in the art for an intrinsically safe or explosion proof assembly and/or enclosure capable of being safely used in varying types of conditions hazardous environments. Also, it would be beneficial if such an enclosure was not permanently coupled to or formed integrally with the protected electrical device, allowing the use of different electrical devices with the same enclosure.

It should be noted that standards differ depending on what part of the world a user is in. It is desirous to have an explosion proof assembly for a mobile device capable of meeting stringent ATEX/IECEx (International Electrotechnical Commission) for zones 1 and 2, in addition to North America Class 1, Divisions 1 and 2 for safe operation around hazardous gas, vapor and dust-based atmospheres. This means any such assembly should be able to meet the most difficult part of any specification, which may be different by way of example each of ATEX, IECEx, and NA.

SUMMARY

Embodiments of the disclosure pertain to an explosion proof assembly that may include first portion having one or more of: a first portion rear face; a first portion outer edge; a first portion inner edge; a first dissipation wall; an isolator receptacle; at least one pin housing receptacle; a corresponding pin that may be movingly disposed through the at least one pin housing receptacle; a sound material receptacle; and a window.

The assembly may include an outer touchscreen may be adhesively sealed around a perimeter of the first portion rear face. The outer touchscreen may resultantly occlude, or otherwise seal off, block, close etc. the window.

The assembly may include a second portion having one or more of: a second portion inner surface that may be defined by a second portion inner edge that transitions into a second dissipation wall; a second portion shoulder; and a second portion window.

The assembly may include a rear element, which may be adhesively sealed around a perimeter of the second portion shoulder. The use of the rear element may resultantly occluding the second portion window.

The assembly may include a mobile device disposed within the first portion and the second portion. The mobile device may be operable via a mobile device touchscreen. The mobile device may include an at least one speaker/microphone.

There may be a sound material plug disposed within the sound material receptacle. The receptacle, and thus the plug, may be proximate to the at least one speaker/microphone. There may be a cover plate coupled with the first portion in a manner to retain the sound material within the sound material receptacle.

In aspects, the first portion and the second portion may be releasably coupled to each other to form an enclosure. In this respect, upon assembly thereof, the outer touchscreen may be engaged with and transmissive to the mobile device touchscreen.

Upon coupling, the second dissipation wall may be adjacent to the first dissipation wall.

The rear element may be inductive to an electrical charge for recharging the mobile device.

The mobile device may include an at least one button. In aspects, the corresponding pin may be aligned with the at least one button. In this respect upon depressing of the corresponding pin may result in depressing the corresponding button.

The mobile device may include an input connector.

The assembly may include an isolator member disposed within the isolator receptacle.

The first portion may include a plurality of first mating apertures, and the second portion comprises a plurality of second mating apertures corresponding to the plurality of first mating apertures, or vice versa. One or more of respective first mating aperture and second mating aperture may have a fastener disposed therein. Any respective fastener may be tightened to a torque value in the range of 5 Newton·meter to about 6 Newton meter.

The mobile device may be configured for taking photos via a camera lens. Thus, either of the first portion and/or the second portion may include a lens window. Upon assembly the camera lens and the lens window may be aligned.

The mobile device is configured for electromagnetic wireless recharging functionality. The mobile device may be recharged while disposed within the enclosure.

The assembly may be configured to at least partially dissipate a flame resultant from an explosion of the mobile device.

The assembly may include other receptacles, such as a second sound material receptacle and a second sound material plug disposed therein.

Any plug may be rectangular prism shape. Any plug material may be stainless steel sintered material. Any plug may have a porosity. In aspects, the porosity may be between about 10 microns to about 30 microns.

Other embodiments of the disclosure pertain to an explosion proof assembly that may include one or more of: a first portion; a second portion releasably coupled therewith to form an enclosure; and a mobile device disposed within the enclosure.

The first portion may include: a first portion rear face; a first portion outer edge; a first portion inner edge; a first dissipation wall; sound material receptacle; and a window.

There may be an outer touchscreen adhesively sealed around a perimeter of the first portion rear face, and resultantly occluding the window.

The second portion may include: a second portion comprising a second portion inner surface defined by a second portion inner edge that transitions into a second dissipation wall; a second portion shoulder; and a second portion window.

There may be a rear element adhesively sealed around a perimeter of the second portion shoulder, and resultantly occluding the second portion window.

The mobile device may be operable via a mobile device touchscreen. The mobile device may have an at least one speaker/microphone.

There may be a sound material disposed within the sound material receptacle in proximity to the at least one speaker/microphone.

The outer touchscreen may be engaged with and transmissive to the mobile device touchscreen.

The rear element may be inductive to an electrical charge for recharging the mobile device.

Other Embodiments of the disclosure pertain to an explosion proof assembly that may include a first portion that may further have a first portion rear face, a first portion outer edge, a first portion inner edge, a second dissipation wall, an isolator housing receptacle, a pin housing receptacle, and a window; an outer touchscreen adhesively sealed around a perimeter of the first portion rear face; a second portion releasably coupled to the first portion, the second portion may further have a second portion inner surface defined by a second portion inner edge that transitions into a first dissipation wall, an isolator housing, and a pin housing.

There may be a first dissipation wall, a second dissipation wall, and a third dissipation wall. The second dissipation wall may be disposed between the first dissipation wall and the third dissipation wall.

The assembly may include a mobile device disposed within the first portion and the second portion. The mobile device may be operable via a mobile device touchscreen. In aspects, the first portion and the second portion may be configured to be releasably coupled to each other. The isolator housing may mate within the isolator housing receptacle. The pin housing may mate within the pin housing receptacle. Upon assembly, the outer touchscreen may be transmissive to the mobile device touchscreen of a touch actuation signal made thereon.

The mobile device may include an input connector. The isolator housing may include an isolator bore. An isolator member may be disposed within the isolator bore.

The mobile device may be configured for taking photos via a camera lens. The second portion may include a lens window. Upon assembly the camera lens and the lens window may be aligned.

The mobile device may include an on-off button. The pin housing may include a movable pin. Upon assembly the movable pin may be aligned with the on-off button. In aspects, depressing of the movable pin may result in depressing the on-off button.

The mobile device may be configured for electromagnetic wireless recharging functionality. The second portion may include a second portion window. A rear window glass may be adhesively sealed therearound to a second portion rear surface, thereby closing off the second portion window.

Upon coupling the assembly may be configured to at least partially dissipate a flame resultant from an explosion of the mobile device.

Other embodiments of the disclosure pertain to an explosion proof assembly that may include a first portion comprising a first portion rear face, a first portion outer edge, a first portion inner edge, a second dissipation wall, an isolator housing receptacle, a pin housing receptacle, and a window; an outer touchscreen adhesively sealed around a perimeter of the first portion rear face; a second portion releasably coupled to the first portion to form an enclosure, the second portion further comprising a second portion inner surface defined by a second portion inner edge that transitions into a first dissipation wall extending substantially therearound, an isolator housing, and a pin housing; a mobile device disposed within the enclosure, the mobile device being operable via a mobile device touchscreen. The isolator housing may mate within the isolator housing receptacle. The pin housing may mate within the pin housing receptacle. Upon coupling the outer touchscreen may be transmissive to the mobile device touchscreen of a touch actuation signal made thereon. The mobile device may include an input connector. The isolator housing may include an isolator bore. An isolator member may be disposed within the isolator bore.

Yet other embodiments of the disclosure pertain to an explosion proof assembly that may include a first portion comprising a first portion rear face, a first portion outer edge, a first portion inner edge, a second dissipation wall, an isolator housing receptacle, a pin housing receptacle, and a window; an outer touchscreen adhesively sealed around a perimeter of the first portion rear face; a second portion releasably coupled to the first portion to form an enclosure, the second portion further comprising a second portion inner surface defined by a second portion inner edge that transitions into an at least first dissipation wall extending substantially therearound, an isolator housing, and a pin housing; a mobile device disposed within the enclosure, the mobile device being operable via a mobile device touchscreen.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein:

FIG. 2A shows a lateral cross-sectional view of an explosion proof assembly according to embodiments of the disclosure;

FIG. 2B shows a zoom-in cross-sectional view of sealing engagement of the explosion proof assembly of FIG. 2A according to embodiments of the disclosure;

FIG. 2C shows a zoom-in cross-sectional view of a flame path with a flame therein of the explosion proof assembly of FIG. 2A according to embodiments of the disclosure;

DETAILED DESCRIPTION

Figure 1A:
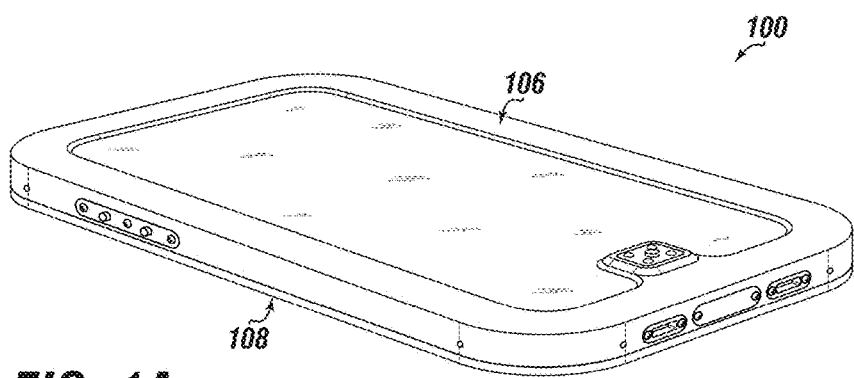
FIG. 1A shows a front-side isometric assembled view of an explosion proof tablet assembly according to embodiments of the disclosure.

Herein disclosed are novel apparatuses, systems, and methods that pertain to an explosion proof assembly, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," "right", "left", "down", etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, o-rings, PTFE between threads, and the like. The make and manufacture of any particular component, subcomponent, etc., may be as would be apparent to one of skill in the art, such as molding, forming, machining, additive manufacturing, etc. Embodiments of the disclosure provide for one or more components to be new, used, and/or retrofitted to existing machines and systems. One or more components may be made from a metallic material, such as stainless steel, aluminum, milled aluminum, metal alloy, etc.

The various characteristics mentioned above, as well as other features and characteristics described in more detail below, will be readily apparent to those skilled in the art upon reading the following detailed description of the embodiments, and by referring to the accompanying drawings.

Terms

The term "connected" as used herein can refer to a connection between a respective component (or subcomponent) and another component (or another subcomponent), which can be fixed, movable, direct, indirect, and analogous to engaged, coupled, disposed, etc., and can be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "fluid" as used herein can refer to a liquid or gas and is not solely related to any particular type of fluid such as hydrocarbons.

The terms "pipe", "conduit", "line" or the like as used herein can refer to any fluid transmission means, and can be tubular in nature.

The term "combustion" as used herein can refer to an exothermic reaction between a fuel and an oxidant that can result in the production of a flame (the visible part of a fire) and a gaseous product.

The term "explosion" as used herein can refer to a combustion in the form of a release of energy in an extreme manner, usually with the generation of high temperatures and the release of gases. An explosion can produce a flame, heat, a shock wave, a pressure wave, or other effects. An explosion can be referred to as a form of combustion.

The term "flame" as used herein can refer to the visible part of a fire. Flame can refer to a product of a combustion reaction emitting visible, infrared, and sometimes ultraviolet light, the frequency spectrum of which depends on the chemical composition of the burning material and intermediate reaction products.

The term "explosion proof assembly" as used herein can refer to an assembly that can adequately prevent an explosion in an environment external to the assembly as a result of an explosion or ignited fire within the assembly.

The term "flame extinguishing enclosure" as used herein can refer to an assemblable enclosure that upon proper coupling together provides or otherwise configures the enclosure with a flame path that is suitable to extinguish (or quench, etc.) a flame that results from a combustion, explosion, or other form of ignited fire from within the enclosure. The term can be further in reference to accomplishing a desired configuration and result in light of certain industry, standards, specifications, requirements, etc. The term "flame dissipating" can be analogous to flame extinguishing.

The term "flame path" as used herein can refer to a spatial region of some amount of direction and/or distance (linear or non-linear) within an explosion proof assembly where a flame may traverse. The explosion proof assembly can be configured in a manner to provide a suitable flame path that ultimately results in the extinguishing of the flame before it (or any part thereof) can leave or otherwise exit the assembly.

The term "transmissive" as used herein can refer to the ability of a material to pass a signal therethrough. For example, a touchscreen of an explosion proof assembly can be transmissive of a signal created by human touch thereto to a touchscreen of a mobile device retained within the assembly that is in contact with therewith. This can occur, for example, by changing an electrical property of both the touchscreens, such as resistance or capacitance.

The term "CNC machined" can refer to a computer numerical control (CNC) process whereby a robot or machinist runs computer-operated equipment to create machine parts, tools and the like.

The embodiments described herein include an explosion proof assembly that includes a tablet computer having a touch screen, such as the iPad® or iPhone produced by Apple, Inc. Particularly, the explosion proof assembly includes a tablet computer or phone disposed within a removably coupled enclosure. The enclosure allows for the use of the tablet computer or phone in hazardous areas including flammable vapors and ignitable dust, corresponding to Class 1 Div2 Class II Div 2, Class 1 Div I, Class 2 Div I, Zone2, Zone22, Zone1 and Zone21 areas. Also, the enclosure allows for the use of the tablet or phone in hazardous areas during Zone/Division 1, 2 conditions. Further, the assembly is configured to be non-incendive such that the assembly does not allow for the release of any sparks or electrical/thermal energy sufficient to cause ignition of hazardous substances in the surrounding environment.

In an embodiment, a non-incentive, non-modified tablet computer or phone (e.g., iPad2, iPad3, iPhone8+, etc.) with an accompanying enclosure is provided that allows a user to operate the tablet in hazardous environments, including Class I/Division 2, Class II/Division 2, Class I/Division 1, Class II/Division 1, ATEX Zone 2, Zone 1 and IECEx classified areas.

Referring initially to FIGS. 1A, 1B, 1C, and 1D together, a front-side isometric assembled view, a back-side isometric assembled view, a front-side isometric component breakout view, and a back-side isometric component breakout view, respectively, of an explosion proof assembly, in accordance with embodiments disclosed herein, are shown Explosion proof assembly 100 is shown in assembled and exploded (or disassembled) configurations and generally includes a mobile device (such as a tablet computer or phone) 102 and an enclosure 104 having a first or upper portion 106 that is releasably coupled to a second or lower portion 108. In embodiments, the mobile device 102 may be a product from Apple, Inc., such as any version of an iPad or an iPod. However, the mobile device 102 may comprise other varying types and styles of tablet computers or phones, including but not limited to those from other manufacturers. In this embodiment, enclosure portions 106, 108, and other (sub)components of the enclosure 104, may be formed from milled aluminum satisfying the NEMA 4 standard.

The enclosure 104 may be configured as a flame extinguishing enclosure. Embodiments herein provide for an explosion proof assembly 100 configured to pass a 'resistance to impact' test in accordance with IEC 60079-0 (see Section 26.4.2 describing a drop-ball test). In the drop-ball test, an object, usually a ball of 1 kg mass, is dropped from a range of 0.2 m to 0.4 m.

Accordingly, it may be desirous for an outer touchscreen 110 to be configured to withstand the impact of the dropped ball without effecting the ability of assembly 100 to be 'explosion proof'. It may be further desirous for a rear glass 155 and/or protective lens 157 to be configured to withstand the impact of the dropped ball without effecting the ability of assembly 100 to be 'explosion proof'.

The outer touchscreen 110, the rear element 155, and/or lens 157 may be a durable, hardened, rugged material suitable for the aforementioned speciation requirements, yet also may be chemical resistant (i.e., unaffected by various chemical environments). Materials include glass, sapphire glass, carbon fiber, other glass composites, and so forth.

"Explosion proof" as referenced to the assembly 100 may refer to the enclosure 104, when assembled, being able to contain substantially or completely any explosion originating therein, as described herein. The enclosure 104, when assembled, may be configured and able to completely extinguish a flame generated from therein, such as from an explosion or other similar failure of mobile device 102.

Enclosure 104 (or any applicable (sub)components) may be formed from milled aluminum satisfying the NEMA 4 standard. However, in other embodiments enclosure 104 may be formed from other rugged materials. Of significance, the explosion proof assembly 100 may be configured for use in hazardous areas, including: North America Class I, Division 1; Class I, Division 2; Class II, Division 2 areas; and Class II, Division 1, and non-US Zone 2 and 1 ATEX and IECEx classified areas. As would be apparent to one of skill in the art, in order to certified by these bodies for satisfactory use within such a setting, various requirements must be met.

Standards pertain to impact, dropping, thermal conditioning (or endurance), thermal shock, temperature requirements, explosive pressure, overpressure, torque test, and so forth.

Figure 1B:
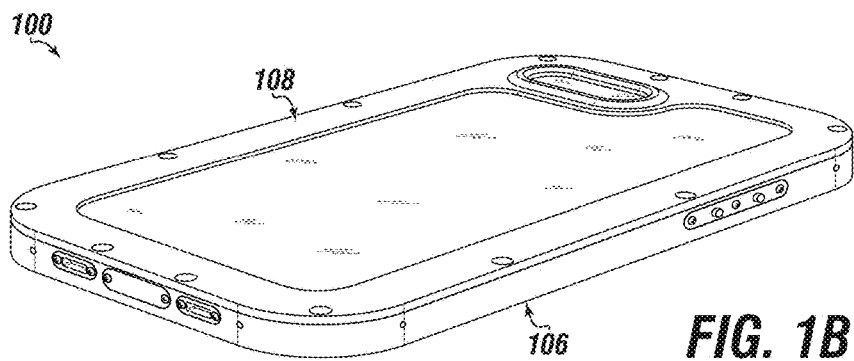
FIG. 1B shows a back-side isometric assembled view of the explosion proof tablet assembly of FIG. 1A according to embodiments of the disclosure.
Figure 1C:
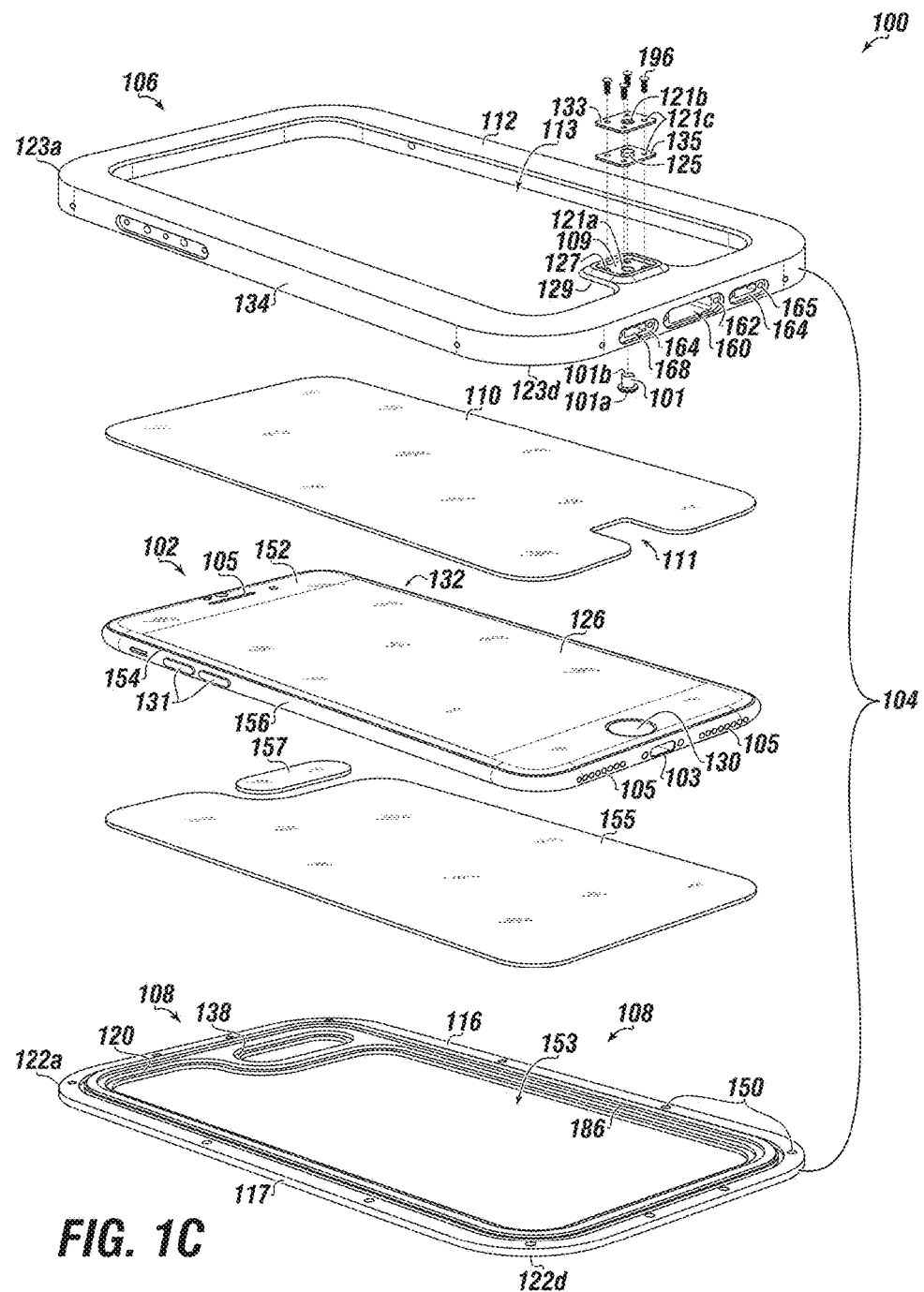
FIG. 1C shows a front-side isometric component breakout view of the explosion proof tablet assembly of FIG. 1A according to embodiments of the disclosure.

FIGS. 1A and 1B show assembly 100 in a closed or assembled configuration where there is no wiring or other conductor exposed to the surrounding environment, while FIG. 1C shows assembly 100 in a breakout view. When assembled the assembly 100 may be configured for use in Class I, Division 1; Class I, Division 2; Class II, Division 2 areas; and Class II, Division 1, and non-US Zone 2 and 1 ATEX and IECEx classified areas.

The assembly 100 may be configured for use in the setting when the upper portion 106 is sealingly coupled with the lowered portion 108, with the mobile device 102 disposed therein. 'Sealingly coupled' may include the portions 106, 108 being sealingly engaged to certain specification, but some amount of disconnect is permissible. In this sense 'sealing' may include reference to a metal-to-metal seal. However, sealing may additionally or alternatively include the use of an o-ring or gasket between the portions 106, 108. The gasket (FIG. 2A) may be configured to aid or enhance sealing engagement with the enclosure 104 in the proximity of the portions 106, 108.

Regarding the enclosure 104, the first portion 106 may include a front face 112. The first portion 106 may include a rear face 114 disposed opposite of front face 112. The rear face 114 may provide a suitable surface for sealing between the rear face 114 and an outer touchscreen 110. The surface for sealing may extend between an inner edge and a rear face inner edge, and therearound the rear face. As would be apparent the first portion 106 may thus have its 'window' (or opening) 113 closed off by the presence of the outer touchscreen 110.

The outer touchscreen 110 may be a thin, flat piece of rigid and durable material suitable to meet various specifications identified herein. One of skill in the art would appreciate the outer touchscreen 110 may be configured to withstand the aforementioned drop-ball test. Accordingly, the outer touchscreen 110 may have a thickness T1 in the range of about 0.5 mm to about 1.2 mm. The thickness T1 may depend on the size of the touchscreen 110, which may further depend on the particular mobile device desired for use. The outer touchscreen 110 may be generally, albeit not limited, rectangular in shape, having dimensions suitable for sealing the window 113. The touchscreen 110 may have one or more regions 111 to accommodate various connectivity between enclosure 104 push devices and buttons of the mobile device 102.

The second portion 108 may include a second portion inner face 116. The inner face 116 may be bordered by a second portion outer edge 117. There may be an inner chamfered surface extending around the inner face 116. The inner surfaces of the second portion 108 may be machined in a manner to accommodate to specification a particular mobile device. In this respect, chamfered or rounded surfaces may instead be linear.

The second portion 108 may include a second portion rear outer face 118. The rear outer face 118 may be generally flat. Just the same, rear outer face 118 may have an at least one raised surface 145. The use of a raised surface may be useful in the event of an underlying raised surface of the mobile device 102. For example, raised surface 145 may coincide with raised mobile device surface 151 (for camera 149). The underside 138 proximate to the raised surface may have a protective lens 157 sealingly engaged therewith. In this respect, the enclosure 104 may be configured to maintain its integrity, even if the mobile device 102 has one or more raised surfaces associated therewith.

The second portion 108 may thus include multiple separated openings (e.g., one for lens 157 and one for rear element 155). The lens 157 may have suitable dimensions (including thickness for occluding (or closing off) the opening proximate to where the camera 149 would be. The thickness of the lens may be about 0.5 mm to about 1.5 mm. The lens 157 may have parallel outer edges and/or rounded outer edges.

The second portion 108 may include one or more corners 122, which may be configured to coincide and align/mate with any respective corners 123 of the first portion 106 (as well as corners of the mobile device 102) (see 122 a, d and 123 a, d).

The outer touchscreen 110 may have a planar underside 124 configured for complete transmissive mating and engagement with a touchscreen 126 of the mobile device 102 via contact point (or interface, layer, etc.). In this respect the assembly 100 may provide the synergistic effect of being able to isolate effects of any internal explosion from the surrounding environment, and yet a user can still access and operate the touchscreen interface (and buttons 130, 131, 132 on/off—not viewable here, etc.) of the mobile device 102. One of skill would appreciate the contact point may be refer to a suitable amount of contact between the surface of the touchscreen 126 and the outer touchscreen 110, whereby the mobile device 102 is accessibly operable via interfacing with the outer touchscreen 110.

The front face 112 may have an outer perimeter surface edge 134 that may extend at around the face 112 and to the rear face 114. The first portion 106 may include the front face 112, and the rear face 114 disposed opposite of the front face 112. The rear face 114 may provide a suitable surface for sealing between the rear face 114 and the outer touchscreen 110. The surface for sealing may extend between an inner edge 136 and the rear face inner edge 137, and therearound the rear face 114.

As illustrated, the outer touchscreen 110 may be adhesively and sealingly connected with the first portion 106, such as via a layer of an adhesive (not viewable here), such as a glue. The glue may be that which is suitable to withstand the hazardous environments discussed herein. The layer of adhesive may provide for a complete perimeter seal between the outer touchscreen 110 and the first portion 106. The adhesive may be suitable to withstand changes of significance in temperature, or chemicals, both from internal and external to the enclosure 104.

The sealing engagement between the outer touchscreen 110 and the first portion 104 may be beneficial to so as to prevent or at least substantially restrict fluids or particles (e.g., dust, particulates, fibers, etc.) from entering or exiting the enclosure 104 when the assembly 100 is in its assembled configuration (e.g., FIG. 1A).

The first portion 106 may similarly have a first dissipation wall 185. In the event of any remnant flame moving past the first dissipation wall 185, the flame will be resisted from passing any further beyond a second dissipation wall 186 (of second portion 108). As a further measure of added redundancy, the first portion 106 may have a third dissipation wall 187. One of skill would appreciate the second portion 108 may have a grooved surface or region to accommodate mating with the first dissipation wall and the third dissipation wall. And similarly the first portion 106 may have a grooved surface or region to accommodate mating with the second dissipation wall 186. The first dissipation wall 185 may be the first (lateral) contact point of any flame resulting from failure of the mobile device 102.

Much like energy in an ocean wave may be dissipated by a barrier (or wall), so may energy from an explosion. One of skill in the art would recognize the structure of a first dissipation wall as being configured and suitable to do such a thing. One of skill would first appreciate that a flame is a form of visible and/or thermal energy that may be dissipated.

The inner face of the second portion 108 may trail off into a surface forming a second dissipation wall 186, which may extend outward and upward from inner edge 120, including in an arcuate manner.

The surface edge 134 of the first portion 106 may be flat, planar, rounded, or any suitable shape, and is not meant to be limited. The surface edge 134 may have one or more bumper mating holes 143, whereby a respective bumper 142 may be coupled therewith (via bumper couplers 144, which may be screws). Accordingly, one or more bumpers 142 may be coupled to the enclosure 104.

The bumper 142 may be of a material suitable for providing extra protection to the mobile device 102, particularly for shock absorption in the case of inadvertent dropping of the assembly 100. Although not limited, the bumper 142 may be made of rubber, plastic, silicone, or other comparable material. Moreover, although the Figures may illustrate one or more corner bumpers, the bumper 142 could have other shapes, including being disposed around the entire perimeter (or in addition or alternatively to other portions) of the assembled enclosure 104.

Of significance, the mating faces—namely faces 114, 116 (including respective undulations, edges, and so forth) and inner surfaces (including respective undulations, edges, and so forth)—may be configured for sealing engagement therebetween. The sealing engagement may be, or at least partially include, metal-to-metal. In order to facilitate the flame extinguishing characteristic of the enclosure 104, it is desirous to have significantly reduced separation between the corresponding mating surfaces of the first portion 106 and the second portion 108.

Any or both of the first portion 106 and the second portion 108 may be made from CNC machining.

In this respect, when the first portion 106 and the second portion 108 are coupled together, the distance between any respective and proximate surface of the portions 106, 108 may be less than about 0.05 inches. In aspects, the gap at any particular proximate contact point may be in the range of about 0.01 inches to about 0.05 inches. The use of an extremely tight or close tolerance seal around the portions 106, 108 is of significance in meeting specification for a certified explosion proof assembly.

The first portion 106 may have one or more first mating apertures 146. The first mating apertures 146 may be configured for receiving respective fasteners 148. In aspects, the fasteners 148 may be screw-type fasteners. As a non-limiting example, the fasteners 148 may be A2 Stainless M5×0.8×8 mm Torx head screws. The fasteners 148 may be insertable through respective second portion apertures 150. Although shown as being insertable through the second portion 108 and threadingly into apertures of the first portion 106, this configuration could just as well be reversed.

Although not limited to any particular arrangement or number, there may be sufficient placement and use of fasteners 148 to promote or otherwise contribute to the desired tolerance fit between the first portion 106 and the second portion 108. The fasteners 148 may be tightened to a fastener torque value in the range of about 3 N·m to about 8 N·m. In aspects, the fastener torque value may be at least 5 N·m. The fastener torque value may be in the range of about 5 N·m to about 6 N·m.

Mobile device 102 may have a front face 152 that may further include a front outer edge 154, as well as the operable touch screen 126. The mobile device 102 may include a rear face that may be defined by a rear outer edge (not viewable here). There may be a chamfered surface or edge 156, which may extend between the outer edge 154 and the rear outer edge. In aspects, there may be one or more chamfered corners.

The mobile device 102 may include a first button 130 (which may be a 'home' button or switch as would be understood by one of skill in the art) disposed on the front face 152. There may be other buttons that provide various functionality based on user interaction, such as a set of second buttons 131 (e.g., volume up/down), and a third button 132 (which may be an 'on/off' button or switch as would be understood by one of skill in the art). The buttons 130, 131, 132 may be disposed on chamfered surface 156, or at any position therearound mobile device 102. In accordance with embodiments herein the first button 130, second button(s) 131, and the third button 132 may be completely accessible and actuatable when the portions 106, 108 are coupled together.

The mobile device 102 may include a camera 149, understood to include or be associated with to include various lenses and related circuitry, software, memory, etc. For example, there may be a protective camera lens 158 of camera 149 (associated with respective camera circuitry), which may be disposed on the rear face 159. In accordance with embodiments herein the camera function of the mobile device 102, including being able to take pictures via lens 158, may be completely accessible and actuatable when the portions 106, 108 are coupled together. The lens 158 may align with outer lens window 157 of second portion 108. The outer lens window 157 may be configured to meet or exceed specification for the explosion proof assembly 100.

The mobile device 102 may include an input connector 103. The input connector may be configured to allow for data and/or electrical power transfer between mobile device 102 and any external electrical device, such as a power charger (including respective cord and connector—not shown here). In accordance with embodiments herein the input connector may be completely isolated from the external environment of the assembly 100 when the portions 106, 108 are coupled together. Still, the input connector may be completely accessible when the portions 106, 108 are coupled together.

The difference in isolation or accessibility to the input connector may be as a result of the presence of an isolator member (or just 'isolator') 107, which may be a plug, a screw, and so forth. In this respect the assembled enclosure 104 may provide the ability for a user to gain access to the input connector 103 without having to resort to disassembly.

As shown here, the isolator 107 may be of suitable size and configuration for sealing engagement into isolator receptacle 160. In embodiments, the isolator 107 may be configured for quick connect and disconnect from the first portion 106, whereby prompt access to input connector 102 may occur. Just the same, the isolator 107 may be fastened securely with the first portion 106 via one or more fasteners 196. The isolator 107 may be configured with one or more apertures 161 alignable to receptacles 162 within the first portion 106. The receptacles 162 need not extend all the way through the first portion 106. The receptacles 162 may be configured for threaded engagement with fasteners 196.

The isolator 107 may have a raised head configured for easy tool access, such as via wrench, allen wrench, or other type of feature suitable for a tool to provide the requisite torque value to the tightened isolator 107. In other embodiments, the enclosure 104 may have a non-torque configuration. For example, the isolator 107 (or respective fasteners) may be self-locking.

The mobile device 102 may have one or more speakers and/or microphones (associated with respective circuitry and memory) 105. Uniquely and advantageously the enclosure 104 may be configured with a sound-passing material 163 that may be positioned proximately to the speakers 105 in a manner whereby sound energy may be passed therethrough, but gases are not. In this respect, the assembly 100 may be used for communication purposes with every little impediment to vocal or sound transmission to the microphone.

Accordingly, in embodiments, one or more material receptacles 164 may be formed or machined, for example, into the side 134, front face 112, and so forth of the first portion 106, or vice versa re the second portion 108. There may be an at least one receptacle 164. As shown here, there may be two receptacles 164—one proximate to each respective speaker/microphone section 105. There may be an at least one receptacle 164 proximate to where a user's ear would be and/or an least one (or another one) receptacle 164 proximate to where a user's mouth would be.

As one of skill would appreciate, the sound-passing material 163 may be configured for snuggly residing within the receptacle, and being held in place by a respective cover plate 167. The cover plate 167 may be securely fastened to the first portion 106 via one or more fasteners 196. The fasteners 196 may be inserted through cover plate apertures 166 and into fastener receptacles 165. The receptacles 165 may be configured for threading engagement with fasteners 196. The receptacles 165 need not extend all the way through the side 134 of the first portion 106. The material receptacles may have respective sound passageways 168.

The sound-passing material 163 is not limited to any particular shape, and may in some sense be referred to as a 'plug' or 'sound plug'. In aspects, the material or plug 163 may be rectangular prism in nature. The plug 163 may be about 1 mm to about 3 mm in depth, about 1 mm to about 3 mm in width (or height), and about 5 mm to about 10 mm in length. However, the dimensions of the plug 163 need only be that to fit within receptacle(s) 164. The plug 163 may allow gaseous material to pass therethrough, such as air, but may be completely impermeable to a flame. As such, any flame internal to the enclosure 104 will not breach.

The plug material 163 may be a stainless steel sintered material. In this respect, the material is made by a welding process of small particles of stainless steel powder by applying heat below the melting point, then machined to a desired shape. The plug 163 may have a porosity of between about 10 microns to 30 microns.

In the case of the new iPhone 8 and later versions, and comparable alternatives, the enclosure 104 may include a rear element or glass 155. The use of the rear element 155 may aid to prevent or mitigate interference with any electromagnetic "wireless" recharging functionality of the mobile device 102. Accordingly, the second portion 108 may have an opening 153 configured to receive the rear element 155.

The rear window element may be comparable in characteristics to that of the outer touchscreen 110; however, rear element 155 and outer touchscreen 110 need not be the same. For example, both may be configured to meet specification of the 'ball drop' test discussed herein, but may be made of different materials. In this respect, outer touchscreen 110 may be configured for signal transmissivity related to human touch, whereas rear element 155 may be configured to be inductive to wireless recharging (e.g., the electrical recharge signal pass through the rear element 155, whereas a solid backing of second portion 208—especially metallic—may not pass the signal).

The assembly 100 may be configured for use in the setting when the upper portion 106 is sealingly coupled with the lowered portion 108, with the mobile device 102 disposed therein. Although not limited, the rear element 155 may be adhesively and sealingly connected with the second portion 108, such as via a layer of an adhesive (not viewable here). The layer of adhesive may provide for a complete perimeter seal between the rear element 155 and the second portion 108. The adhesive may be suitable to withstand changes of significance in temperature, or chemicals, both from internal and external to the enclosure 104.

The enclosure 104 may have various other points of isolation and accessibility to accommodate 'explosion proof' capability, yet at the same time button interactability with the mobile device 102.

For example, the first portion 106 may have a first button isolation region 190. The region 185 may be configured as a recess within the first portion 106, which may also be on the outer edge or side 134. The region 190 may have a first set of holes 191a fully through the first portion 106 in order to accommodate passage of push pins 192. Although shown here in a quasi-parallel elliptical shape, the shape of the recessed region 190 is not meant to be limited.

A first pliable insert 193 may be configured to fit and set within (including entirely) in the region 190. The pliable insert 193 may be any suitable durable material, such as rubber. The pliable insert 193 may have one or more protruding nubs 194 configured to extend outward of the enclosure 104 once cover plate 195 is installed thereon. Any pliable insert of the disclosure may be made of rubber or rubber-like material.

In assembly, the end 192b of push pin 190 will reside within an underside portion of protruding nub 194, such that pushing on protruding nub 194 will result in depression of the other end of the pin 192 against the respective button(s) 131.

The cover plate 195 may be coupled to the first portion 106 via one or more plate fasteners (such as screws) 196.

The fasteners 196 may pass through aligned apertures of the cover plate and the pliable insert 193, and into receptacles 191b. Notably, receptacles 191b need not extend all the way through the portion 106. Receptacles 191b may be threaded for threaded engagement with fasteners 196.

To any extent other buttons of the mobile device 102 may need to be accessible, there may be other comparable structures. Thus, there may be a second recessed region (not viewable here). The region may be configured as a recess within the first portion 106, which may also be on the outer edge or side 134. The region may have a first set of holes (or hole) 198a fully through the first portion 106 in order to accommodate passage of a push pin(s) 197. Although shown here in a quasi-parallel elliptical shape, the shape of the recessed region is not meant to be limited.

A second pliable insert 193a may be configured to fit and set within (including entirely) in the second region. The pliable insert 193a may be any suitable durable material, such as rubber. The pliable insert 193a may have one or more protruding nubs (not viewable here) configured to extend outward of the enclosure 104 once cover plate 195a is installed thereon.

In assembly, the end 197b of push pin 197 will reside within an underside portion 194a of protruding nub, such that pushing on the protruding nub will result in depression of the other end of the pin 192 against the respective button(s) 132.

The cover plate 195a may be coupled to the first portion 106 via one or more plate fasteners (such as screws) 196. The fasteners 196 may pass through aligned apertures of the cover plate and the second pliable insert 193a, and into receptacles (not viewable here). Notably, the fastener receptacles need not extend all the way through the portion 106. Receptacles may be threaded for threaded engagement with fasteners 196.

In embodiments, mobile device 102 may have other button orientation, such as on the front side 152 or rear side 159. As shown, the mobile device 102 may have a 'Home' button 130. Thus, the assembly 104 may comparably be configured to provide interactablity thereto. For example, the first portion may have a lateral extension structure or section 129. The section 129 may be configured with a (third) recessed region 109.

The region 109 may be configured as a recess within the first portion 106 (or extension section 129), which may also be on or proximately associated with the top side 112. The region may have a first set of holes (or hole) 121a fully through the first section 129 in order to accommodate passage of a push pin(s) 101. Although shown here in a rounded quadrilateral shape, the shape of the recessed region is not meant to be limited.

A third pliable insert 135 may be configured to fit and set within (including entirely) in the region 109. The pliable insert 135 may be any suitable durable material, such as rubber. The pliable insert 135 may have one or more protruding nubs 125 configured to extend outward of the enclosure 104 once cover plate 133 is installed thereon.

In assembly, the end 101b of push pin 101 will reside within an underside portion of protruding nub 125, such that pushing on the protruding nub will result in depression of the other end 101a of the pin 101 against the respective button 130.

The cover plate 133 may be coupled to the first portion 106 via one or more plate fasteners (such as screws) 196. The fasteners 196 may pass through aligned apertures 121 b, c of the cover plate 133 and the pliable insert 135, respectively, and into receptacles 127. Notably, the fastener receptacles 127 need not extend all the way through the portion 106 (or section 129). Accordingly, the extension section 129 may be configured with a desirable thickness or depth to accommodate a sufficient amount of length of the fasteners 196. Receptacles 127 may be threaded for threaded engagement with fasteners 196.

Although described as in the first portion 106, embodiments herein provide for modification of the portions 106, 108 to the point that the second portion may be configured comparably and vice versa.

In this respect the assembled enclosure 100 may provide the ability for a user to gain access to the buttons of the mobile device without having to resort to disassembly, although not meant to be limited to any particular type of isolation/access configuration.

Figure 5B:
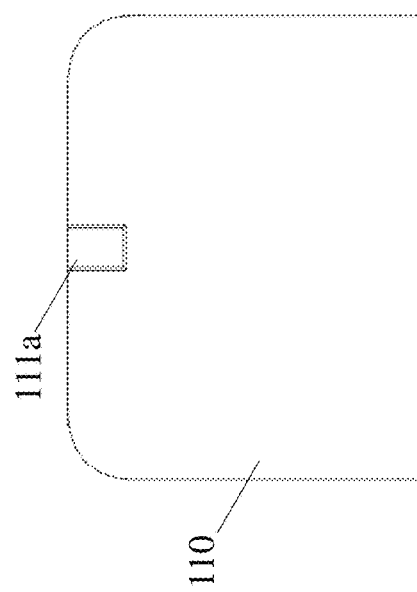
FIG. 5B shows a downward-looking partial frontal view of an outer touchscreen with a recessed region according to embodiments of the disclosure.
Figure 5A:
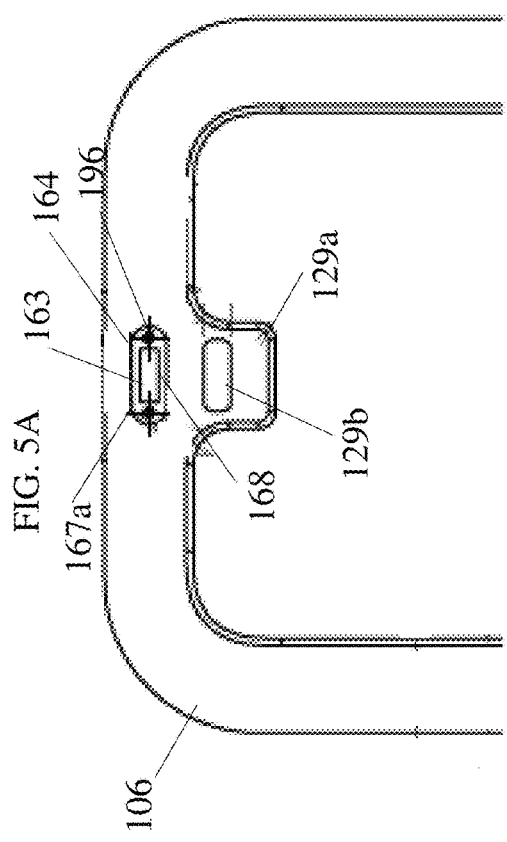
FIG. 5A shows a downward-looking partial frontal view of a first portion having another or alternative extension according to embodiments of the disclosure.

Referring briefly to FIGS. 5A and 5B together, a frontward view of a first portion having another or alternative extension and a frontward view of a touchscreen with a recessed region, in accordance with embodiments herein, are shown.

The assembly 100 may include either of the first portion 106 or second portion 108 having an additional or alternative extension 129a. In a similar respect, the outer touchscreen 110 may include a regions 111a to accommodate various connectivity between enclosure 104 push devices and buttons of the mobile device 102 and/or one or more speakers and/or microphones (associated with respective circuitry and memory). As mentioned herein, the assembly 100 may be used for communication purposes with every little impediment to vocal or sound transmission to the microphone.

The extension 129a may include a gap or hole 129b. The gap/hole 129b may provide suitable clearance whereby an ambient light sensor and/or proximity sensor of the mobile device (not shown here) are unimpeded by the enclosure. Thus, the depth of the gap/hole 129b may extend through the thickness of the extension 129a.

While the region 111a may be comparable to that of region 111, the region 111a need not exceed all the way through the thickness of the outer touchscreen 110, and thus may be contemplated as being thinned or recessed. Thinning of the region 111a may promote improved sound performance from the speaker to a user's ear (i.e., the less glass thickness, the less impediment to sound waves). Just the same, in embodiments, region 111 may be thinned and/or region 111a may exceed through the thickness.

Figure 1D:
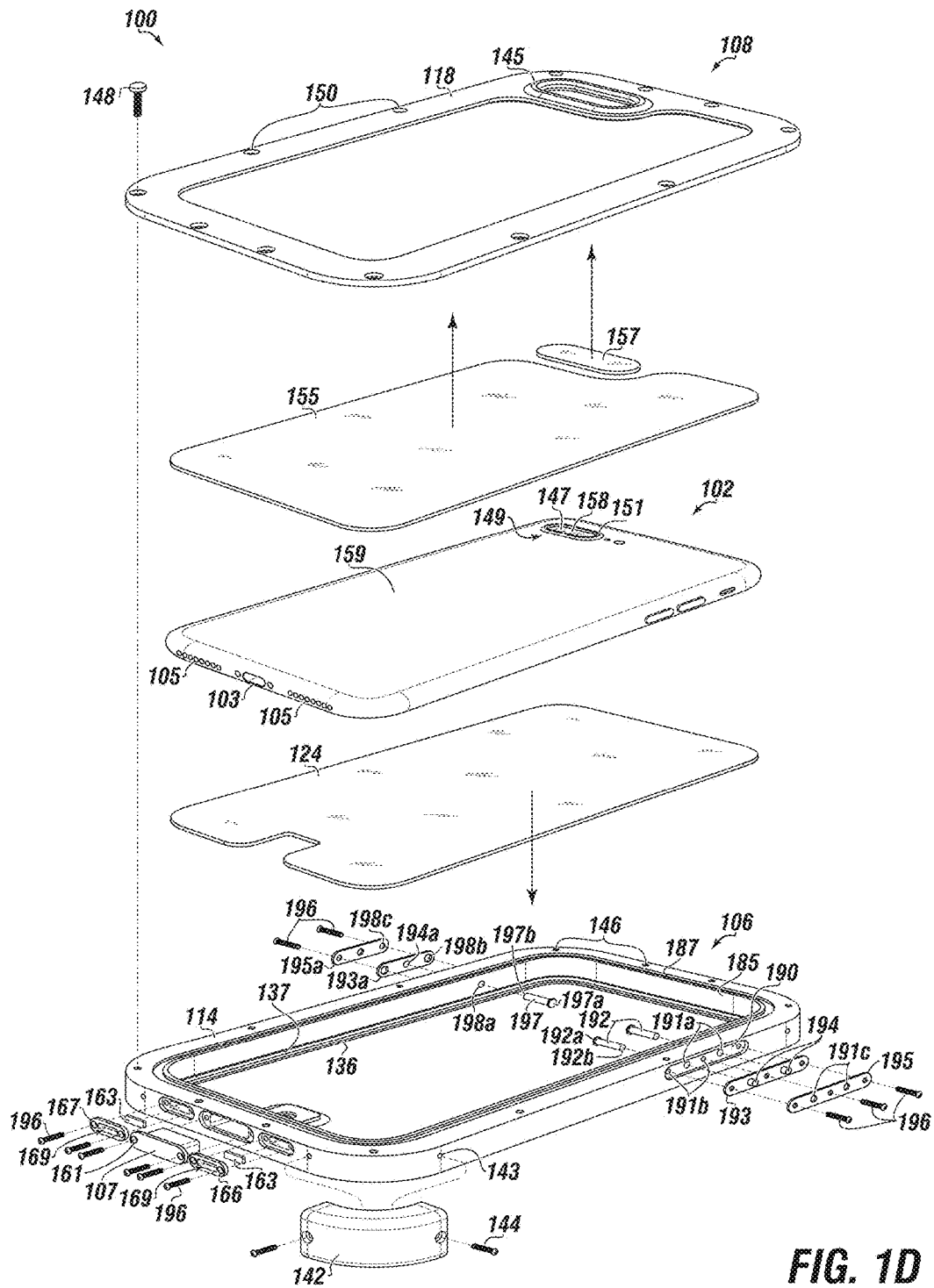
FIG. 1D shows a back-side isometric component breakout view of the explosion proof tablet assembly of FIG. 1A a lateral cross-sectional view of an explosion proof assembly according to embodiments of the disclosure.

To further aid sound transmission, the first portion 106 or second portion (not shown here) may include yet another material receptacles (not viewable here) formed or machined thereinto (like that of FIG. 1D). The receptacle may be proximate to any respective speaker/microphone section understood to be disposed tantamount to what would be proximate to a user's ear. As one of skill would appreciate, the sound-passing material 163 may be configured for snuggly residing within the receptacle, and being held in place by a respective cover plate 167a. The cover plate 167a may be securely fastened one or more fasteners 196. The fasteners 196 may be inserted through cover plate apertures and into fastener receptacles. The receptacles may be configured for threading engagement with fasteners. The receptacles need not extend all the way through the first portion 106. The material receptacles may have respective sound passageways (not viewable here). The sound-passing material (not viewable here) may be like that as described herein.

Referring now to FIGS. 2A, 2B, and 2C together, a lateral cross-sectional view of an explosion proof assembly, a zoom-in cross-sectional view of sealing engagement of the explosion proof assembly, and a zoom-in cross-sectional view of a flame path with a flame therein of the explosion proof assembly, in accordance with embodiments disclosed herein, are shown.

As should be apparent, FIGS. 2A-2C may not be to scale. Instead, the Figures are intended to illustrate that upon zoom-in inspection, various passageways, gaps, and interstices may be present when the enclosure is assembled together (i.e., first portion 206 and second portion 208 are coupled together). For example, there may be a gap 283 having a distance of less than about 0.04 inches (1000 microns) between various contact points of the first portion 206 and the second portion 208.

Although theoretically this could result in passage of, for example, gaseous material, air, and so forth, one of the key attributes of the assembly 200 is the ability to dissipate a flame. At the same time, the mobile device 202 may be interacted with (for example, pin 297 may be depressed external to an outer side 234, and subsequently activating a button 232 of the mobile device.

Regarding the assembly 200, the first portion 206 may include a front face 212. The first portion 206 may include a rear face or backside 214 disposed opposite of front face 212. The rear face 214 may provide a suitable surface 215 for sealing between the first portion 206 and an outer touchscreen 210. The surface for sealing 215 may extend between an inner edge 236 and a rear face inner edge 237, and thereabound the rear face surface 215.

The outer touchscreen 210 may be adhesively and sealingly connected with the first portion 206, such as via a layer of an adhesive 284. The layer of adhesive 284 may provide for a complete perimeter seal between the outer touchscreen 210 and the first portion 206. The adhesive may be suitable to withstand changes of significance in temperature, or chemicals, both from internal and external to the enclosure 204.

The sealing engagement between the outer touchscreen 210 and the first portion 206 may be beneficial to so as to prevent or at least substantially restrict fluids or particles (e.g., dust, particulates, fibers, etc.) from entering or exiting the enclosure 204 when the assembly 200 is in its assembled configuration (e.g., FIG. 1A). The sealing may further prevent any flame path between portion 206 and the outer touchscreen 210.

The second portion 208 may include a second portion inner face 216. The inner face 216 may be bordered by a second portion outer edge 217. The second portion 208 may include the second portion rear outer face 218. The rear outer face 218 may be generally flat. The inner face 216 may trail off into a surface forming the second dissipation wall 286, which may extend outward and upward from edge surface 220, including in an arcuate or shoulder-edged manner, into proximate engagement with the first portion 206. As shown, the first dissipation wall 285 may be the first (lateral) contact point of any flame 288 resulting from failure of the mobile device 202.

The second portion 208 may similarly have a second dissipation wall 286. In the event of any remnant flame 288 moving past the first dissipation wall 285, the flame 288 will be resisted from passing any further beyond the second dissipation wall 286. Still, as a further measure of added redundancy, the first portion may have a third dissipation wall 287. One of skill would appreciate the second portion 208 may have a grooved surface or region to accommodate mating with the first dissipation wall 285 and the third dissipation wall 287. And similarly the first portion 206 may have a grooved surface or region to accommodate mating with the second dissipation wall 286. To the naked eye the first portion 206 and second portion 208 may fit seamlessly together.

The first portion 206 and the second portion 206 may be configured for assembly together whereby a flame extinguishing (or quenching) path 289 may be formed. The extinguishing path 289 may be likened to a path of least resistance. That is, in the event of an explosion within the enclosure 204, the resultant flame 288 travels therein. Like any joint, where the first portion 206 and second 208 are coupled together may be the path of flame travel.

To meet various standards, such as the more stringent requirements for Class 1 Div I or Zone 1, the enclosure 204 is required to be able to withstand the effects of an internal combustion or explosion that may produce a flame, which could in turn be an ignition source for various materials that may be associated with the Class 1 Div I or Zone 1.

It has been discovered that the flame 288 (or its energy) may be extinguished or otherwise dissipated by the presence of one or more flame barriers or dissipation walls 285, 286, 287.

This includes in the event a rear glass 255 is utilized. Although referred to as 'glass', other non-glass materials may be used. As mentioned herein, new mobile devices may be configured with inductive (wireless) (re)chargability to alleviate the need to plug in a power cord. Thus, the rear glass 255 may be any material suitable to accommodate induction, yet sufficient to meet requirements and specifications described herein for explosion proofing. To accommodate, the enclosure may include the rear glass 255 sealingly engaged with the second portion 208. Thus, the second portion 208 may have an opening 253 sealed/closed off by the presence of the rear glass (analogous to opening 113 and outer touchscreen 110), including use of a layer of sealing material between glass 255 and lip or edge 270.

Sealing may be aided by the use of gasket 228, which may be disposed in a gasket groove 228a formed in either or both of the first portion 206 and the second portion 208.

One of skill would appreciate a similar sealing ability in the event additional glass or lens (FIG. 1C, 157) may be needed for raised surface 245.

Figure 3A:
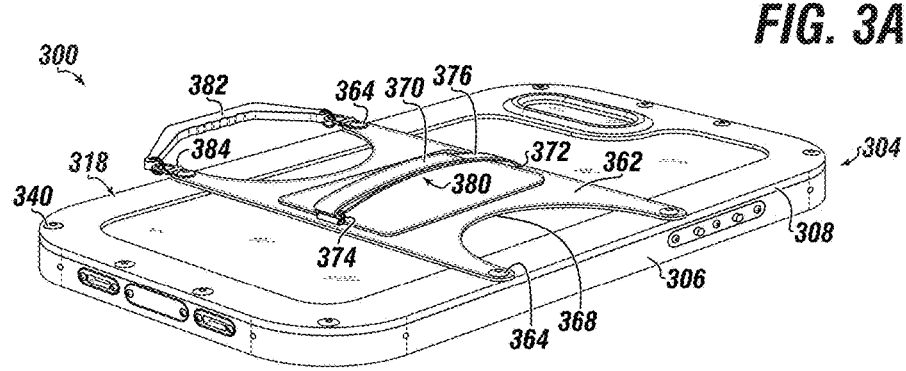
FIG. 3A shows a top view of a hand-held accessory releasably coupled to a rear side of an explosion proof assembly according to embodiments of the disclosure.
Figure 3B:
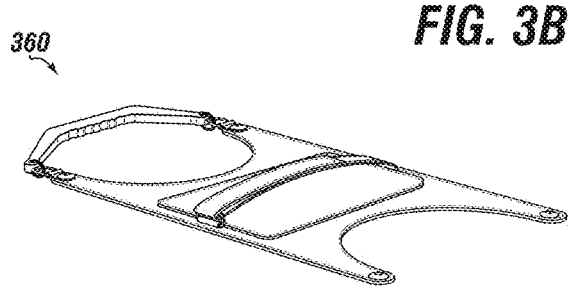
FIG. 3B shows a top view of the hand-held accessory of FIG. 3A according to embodiments of the disclosure.
Figure 3C:
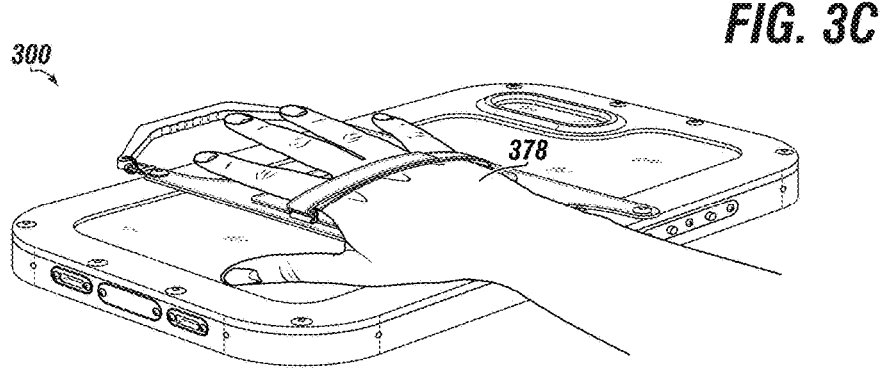
FIG. 3C shows a side profile view of a user holding the explosion proof assembly of FIG. 3A according to embodiments of the disclosure.

Referring now to FIGS. 3A, 3B, and 3C together, a top view of a hand-held accessory releasably coupled to a rear side of an explosion proof assembly, a top view of the hand-held accessory of FIG. 3A, and a side view of a user holding the explosion proof assembly of FIG. 3A, respectively, in accordance with embodiments disclosed herein, are shown.

While it need not be exactly the same, an assembly 300 may be like that of assembly 100 of FIGS. 1A-1C, etc., and components thereof may be duplicate or analogous. Thus, only a brief discussion of the assembly 300 is provided, recognizing that differences, if any, would be discernable by one of skill in the art, especially in view of the present disclosure.

As illustrated, explosion proof assembly 300 may include a mobile device (not shown here) associated with a flame extinguishing enclosure 304. The enclosure 304 may include a first or upper portion 306 configured for releasable coupling to a second or lower portion 308. In aspects, the mobile device 302 may be an iPad® or iPhone® produced by Apple, Inc.

The assembly 300 may be configured for use in the setting when the upper portion 306 is sealingly coupled with the lowered portion 308, with the mobile device disposed therein. 'Sealingly coupled' may include the portions 306, 308 being sealingly engaged to certain specification, but some amount of disconnect is permissible. In this sense 'sealing' may refer to or include a metal-to-metal seal.

To aid in use of the assembly 300, various accessories may be utilized, including those that provide additional grip, shock absorption, hand-holding, and the like. As shown, an attachable hand-holding accessory 360 may be coupled to the assembly, such as to the rear side 318 of the second portion 308.

Although not limited to any particular hand-holding accessory configuration (and material selection thereof), the accessory 360 may be made of a nylon-based material.

The accessory 360 may have an attachment backing 362, which may be of minimal thickness and generally polygonal in shape. The backing 362 may be configured for releasable attachment to the rear face 318. In this respect, the backing 362 may have one or more apertures (not viewable here) for receiving a respective attachment fastener 364 therethrough. As shown, there may be a fastener 364 inserted through four corner apertures. Accordingly, the second portion 308 may also have receptacles (not viewable here) that align with the apertures, to which the fastener 364 may be securely positioned therein. In aspects, the fasteners 364 may be screwed into the second portion 308.

It may be desirous to attach and detach the accessory 360 without having to jeopardize the integrity of the assembled enclosure 304. Thus, the receptacles need not have a depth that extends all the way through the thickness of the second portion 308. Accordingly, the second portion 308 may have various raised faces 366 to accommodate and appreciable amount of material depth to which the fastener 364 may extend.

In other aspects, it may be desirous to disassemble the enclosure 304 without removing the accessory 360. Thus, the accessory 360 may be shaped in a manner to provide access to enclosure fasteners 340. As shown, the accessory 360 may have one or more arcuate segments 368.

The accessory 360 may have a hand hold strap 370. The strap 370 may be movably, yet fixedly connected at strap attachment point 372. While not meant to be limited to any particular hand hold configuration, the hand hold strap 370 may be of sufficient length for inserting into an eyelet 374, and then wrapping back over for self-securing to itself, such as via a Velcro layer (e.g., a mini-hook/loop) 376. The layer 376 may be of suitable size to provide adjustment for accommodation of hands of various sizes, as would be apparent to one of skill in the art.

As shown in FIG. 3C, a user 378 can slide his/her hand into the hand-insertion region 380. Using the hand on the back of the enclosure 304 may provide extra stability as the user 378 interfaces with the mobile device via the outer touchscreen.

For further convenience, a carrying handle 382 may be coupled to the enclosure 304. As illustrated in FIG. 3A, the handle 382 may be coupled to the second portion 308 via handle couplers 384 on each side of the handle.

Figure 4A:
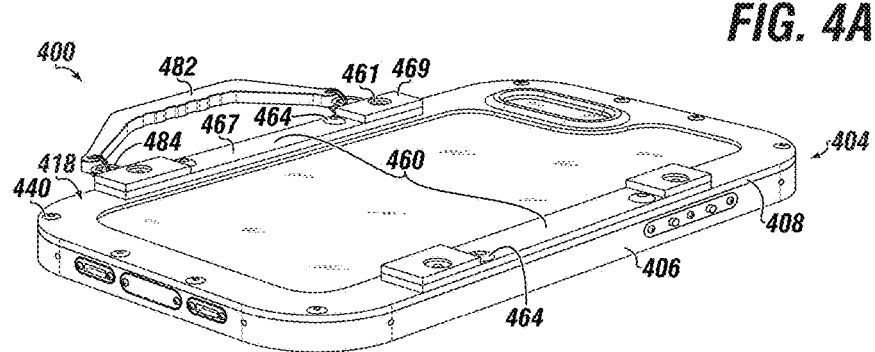
FIG. 4A shows a top view of a magnetic attachment accessory releasably coupled to a rear side of an explosion proof assembly according to embodiments of the disclosure.
Figure 4B:
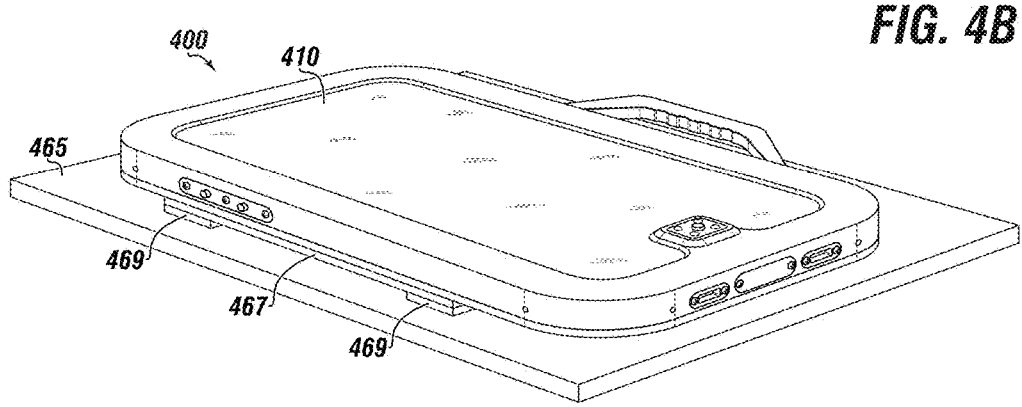
FIG. 4B shows a side profile view of a user using the explosion proof assembly of FIG. 4B while magnetically attached to a surface according to embodiments of the disclosure.

Referring now to FIGS. 4A and 4B together, a top view of a magnetic attachment accessory releasably coupled to a rear side of an explosion proof assembly and a side view of the explosion proof assembly of FIG. 4B while magnetically attached to a surface, respectively, in accordance with embodiments disclosed herein, are shown.

While it need not be exactly the same, an assembly 400 may be like that of any assembly disclosed herein, and components thereof may be duplicate or analogous. Thus, only a brief discussion of the assembly 400 is provided, recognizing that differences, if any, would be discernable by one of skill in the art, especially in view of the present disclosure.

As illustrated, explosion proof assembly 400 may include a mobile device (not shown here) associated with a flame extinguishing enclosure 404. The enclosure 404 may include a first or upper portion 406 configured for releasable coupling to a second or lower portion 408.

To aid in use of the assembly 400, various accessories may be utilized, including those that provide additional grip, shock absorption, hand-holding, and the like. As shown in FIGS. 4A-4B, magnetic attachment accessory 460 may be coupled to the assembly, such as to the rear side 418 of the second portion 408.

Although not limited to any particular accessory configuration (and material selection thereof), the accessory 460 may include various magnetic and non-magnetic components coupled together. As shown in the Figures, the accessory 460 may include at least on non-magnetic support bar 467 coupled to raised faces 466. The support bar 467 may have a generally rectangular prism shape The backing support bar(s) 467 may be configured for releasable attachment to the rear face 418. In this respect, the support bar 467 may have one or more apertures (partially viewable here) for receiving a respective attachment fastener 464 therethrough. As shown, there may be a fastener 464 inserted through apertures on each end of the support bar(s) 467. Accordingly, the second portion 408 may also have receptacles (not viewable here) that align with the apertures, to which the fastener 464 may be securely positioned therein. In aspects, the fasteners 464 may be screwed into the second portion 406.

Although a magnet 469 may be directly coupled to the rear face 418, the Figures show the magnet 469 coupled onto the support bar 467. In aspects, there may be a first magnet on one end of the support bar 467, and a second magnet disposed on the opposite end of the support bar. An other side of second portion 408 may have a similar support bar/magnet configuration (e.g., a support bar 467 on each side, and a magnet 469 on each end of the respective support bar). The magnet 469 may be attached via a magnet fastener 461.

It may be desirous to attach and detach the accessory 460 without having the jeopardize the integrity of the assembled enclosure 404. Thus, the receptacles need not have a depth that extends all the way through the thickness of the second portion 408. Accordingly, the second portion 408 may have various raised faces 466 to accommodate and appreciable amount of material depth to which the fastener 464 may extend and engage therein. As shown the presence of the raised faces 466 may provide suitable clearance 463 so that the support bar 467 does not come into inadvertent contact with enclosure fasteners 440.

As shown in FIG. 4B, a user may magnetically attach the assembly 400 to a suitable surface, which may provide extra stability as the user interfaces with the mobile device via outer touchscreen 410. Moreover, the user is now relieved of having to use one hand to hold the assembly 400.

For further convenience, a carrying handle 482 may be coupled to the enclosure 404. The handle 482 may be coupled to the second portion 408 via handle couplers 4529 on each side of the handle.

Embodiments herein provide for a method of forming an explosion proof assembly that generally includes placing or disposing a mobile device within an enclosure comprising a first portion sealingly engaged with a second portion. Such an assembly may be suitable to completely satisfy requirements of Class I, Division 2 and Class II, Division 2 hazardous area classifications. Also, an operable touchscreen of a mobile device may be safely interfaced and actuated within Class I, Division 2 and Class II, Division 2 hazardous areas without violating the safety requirements of these areas.

Advantages

Previously operators/users would not be allowed to carry an electronic mobile device with them into hazardous areas (C1D2/Zone2/Zone2/Zone 1) as there was no guaranty these devices will not create a spark (i.e., explosion). So they were using pen and paper to do their job (inspection, maintenance, turn arounds, etc.).

Embodiments of the disclosure advantageously provide for an explosion proof assembly that may allow operators/users to now carry their mobile devices within an explosion proof assembly of the disclosure. Users can now advantageously and beneficially use customized Apps, take pictures, take videos, and collaborate with their peers, such via Skype or other Apps. Their work is a lot more efficient and is still safe.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of any claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. An explosion proof assembly comprising:
   a first portion comprising:
      a first portion rear face;
      a first portion outer edge;
      a first portion inner edge;
      a first dissipation wall;
      an isolator receptacle;
      at least one pin housing receptacle;
      a corresponding pin movingly disposed through the at least one pin housing receptacle;
      a plurality of first mating apertures;
      a sound material receptacle; and
      a window;
   an outer touchscreen adhesively sealed around a perimeter of the first portion rear face, and resultantly occluding the window;
   a second portion comprising:
      a second portion inner surface defined by a second portion inner edge that transitions into a second dissipation wall;
      a second portion shoulder; and a second portion window;
      a plurality of second mating apertures; and
      a rear element adhesively sealed around a perimeter of the second portion shoulder, and resultantly occluding the second portion window;
   a mobile device disposed within the first portion and the second portion, the mobile device being operable via a mobile device touchscreen, and further comprising an at least one speaker/microphone;
   a sound material disposed within the sound material receptacle proximately to the at least one speaker/microphone;
   a cover plate coupled with the first portion proximate to the sound material receptacle;
   wherein the first portion and the second portion are releasable coupled to each other to form an enclosure, wherein upon assembly the outer touchscreen is engaged with and transmissive to the mobile device touchscreen, wherein the second dissipation wall is adjacent to the first dissipation wall, wherein each respective first mating aperture and second mating aperture has a fastener disposed therein, and wherein each fastener is tightened to a torque value in the range of 5 Newton·meter to about 6 Newton·meter, and wherein the rear element is inductive to an electrical charge for recharging the mobile device.

2. The explosion proof assembly of claim 1, wherein the mobile device comprises an at least one button, wherein upon the corresponding pin is aligned with the at least one button, and wherein depressing of the corresponding pin results in depressing the corresponding button.

3. The explosion proof assembly of claim 1, wherein the mobile device comprises an input connector, wherein an isolator member is disposed within the isolator receptacle.

4. The explosion proof assembly of claim 1, wherein the mobile device is configured for taking photos via a camera lens, wherein the second portion comprises a lens window, and wherein upon assembly the camera lens and the lens window are aligned.

5. The explosion proof assembly of claim 1, wherein the mobile device is configured for electromagnetic wireless recharging functionality.

6. The explosion proof assembly of claim 1, the assembly further comprising a second sound material receptacle and a second sound material disposed therein, wherein the sound material and the second sound material are plugs in a rectangular prism shape, wherein the sound material and the second sound material each comprise stainless steel sintered material, and wherein the sound material and the second sound material each comprise a porosity of between about 10 microns to 30 microns.

7. An explosion proof assembly comprising:
a first portion comprising:
a first portion rear face;
a first portion outer edge;
a first portion inner edge;
a first dissipation wall;
a sound material receptacle;
a plurality of first mating apertures; and
a window;
an outer touchscreen adhesively sealed around a perimeter of the first portion rear face, and resultantly occluding the window;
a second portion comprising:
a second portion inner surface defined by a second portion inner edge that transitions into a second dissipation wall;
a plurality of second mating apertures;
a second portion shoulder; and
a second portion window;
a rear element adhesively sealed around a perimeter of the second portion shoulder, and resultantly occluding the second portion window;
a mobile device disposed within the first portion and the second portion, the mobile device being operable via a mobile device touchscreen, and further comprising an at least one speaker/microphone;
a sound material disposed within the sound material receptacle in proximity to the at least one speaker/microphone;
wherein the first portion and the second portion are releasable coupled to each other to form an enclosure, wherein upon assembly the outer touchscreen is engaged with and transmissive to the mobile device touchscreen, wherein each respective first mating aperture and second mating aperture has a fastener disposed therein, and wherein each fastener is tightened to a torque value in the range of 5 Newton·meter to about 6 Newton·meter, and wherein the rear element is inductive to an electrical charge for recharging the mobile device.

8. The explosion proof assembly of claim 7, wherein the first portion further comprises: an isolator receptacle; at least one pin housing receptacle; and a corresponding pin movingly disposed through the at least one pin housing receptacle.

9. The explosion proof assembly of claim 8, wherein the mobile device comprises an at least one button, wherein the corresponding pin is aligned with the at least one button whereby depressing of the corresponding pin results in depressing the corresponding button.

10. The explosion proof assembly of claim 9, wherein the mobile device comprises an input connector, wherein an isolator member is disposed within the isolator receptacle.

11. The explosion proof assembly of claim 7, wherein the mobile device is configured for taking photos via a camera lens, wherein the second portion comprises a lens window separate from the rear element, and wherein upon assembly the camera lens and the lens window are aligned.

12. The explosion proof assembly of claim 11, wherein the mobile device is configured for electromagnetic wireless recharging functionality.

13. The explosion proof assembly of claim 7, the assembly further comprising a second sound material receptacle and a second sound material disposed therein,
wherein the mobile device is configured for electromagnetic wireless recharging functionality, wherein the sound material and the second sound material are plugs in a rectangular prism shape, wherein the sound material and the second sound material each comprise stainless steel sintered material, and wherein the sound material and the second sound material each comprise a porosity of between about 10 microns to 30 microns.

14. The explosion proof assembly of claim 13, wherein upon coupling the assembly is configured to at least partially dissipate a flame resultant from an explosion of the mobile device prior to any portion of the flame exiting the assembly.

15. An explosion proof assembly comprising:
a first portion comprising:
a first portion rear face;
a first portion outer edge;
a first portion inner edge;
a first dissipation wall;
a first sound material receptacle;
a plurality of first mating apertures;
a second sound material receptacle; and
a window;
an outer touchscreen adhesively sealed around a perimeter of the first portion rear face, and resultantly occluding the window;
a second portion comprising:
a second portion inner surface defined by a second portion inner edge that transitions into a second dissipation wall;
a plurality of second mating apertures;
a second portion shoulder; and
a second portion window;
a rear element adhesively sealed around a perimeter of the second portion shoulder, and resultantly occluding the second portion window;
a mobile device disposed within the first portion and the second portion, the mobile device being operable via a mobile device touchscreen, and further comprising an at least two speaker/microphones; and
a sound material plug disposed within each of the first sound material receptacle and the second sound material receptacle in proximity to the respective speaker/microphone;
wherein the first portion and the second portion are releasable coupled to each other to form an enclosure, wherein upon assembly the outer touchscreen is engaged with and transmissive to the mobile device touchscreen, wherein each respective first mating aperture and second mating aperture has a fastener disposed therein, and wherein each fastener is tightened to a torque value in the range of 5 Newton·meter to about 6 Newton·meter, and wherein the rear element is inductive to an electrical charge for recharging the mobile device.

16. The explosion proof assembly of claim 15, wherein the first and second sound material plugs are each a rectangular prism shape, and wherein each of the first and second plugs comprise stainless steel sintered material.

17. The explosion proof assembly of claim 16, wherein the enclosure is configured to at least partially dissipate a flame resultant from an explosion of the mobile device, wherein the second dissipation wall is disposed between the first dissipation wall and a third dissipation wall of the first portion, wherein the mobile device is configured for taking photos via a camera lens, wherein the second portion comprises a lens window, and wherein upon assembly the camera lens and the lens window are aligned.

* * * * *